(12) United States Patent      (10) Patent No.:    US 8,781,135 B2
Lu      (45) Date of Patent:    Jul. 15, 2014

(54) TOUCH PEN WITH WIRELESS VOICE CAPABILITY

(75) Inventor: Ho-Lung Lu, New Taipei (TW)

(73) Assignee: Dexin Corporation, New Taipei (TW)

( * ) Notice: Subject to any disclaimer, the term of this patent is extended or adjusted under 35 U.S.C. 154(b) by 320 days.

(21) Appl. No.: 13/269,554

(22) Filed: Oct. 7, 2011

(65)      Prior Publication Data

US 2013/0051576 A1    Feb. 28, 2013

(30)      Foreign Application Priority Data

Aug. 24, 2011    (TW) ............................. 100215816 U

(51) Int. Cl.
     *H04B 5/00*          (2006.01)
(52) U.S. Cl.
     USPC ................ 381/79; 381/77; 381/334; 381/386
(58) Field of Classification Search
     USPC .............................. 381/77–85, 334, 361, 386
     See application file for complete search history.

(56)      References Cited

U.S. PATENT DOCUMENTS

| | | | |
|---|---|---|---|
| 7,372,970 B2* | 5/2008 | Ach-Kowalewski | 381/322 |
| 7,986,793 B2* | 7/2011 | Wilson | 381/81 |
| 2002/0076683 A1* | 6/2002 | Chen | 434/317 |
| 2006/0165244 A1* | 7/2006 | Wu | 381/77 |
| 2007/0205996 A1* | 9/2007 | Huang | 345/179 |
| 2007/0263893 A1* | 11/2007 | Kim | 381/334 |
| 2008/0075295 A1* | 3/2008 | Mayman et al. | 381/79 |
| 2008/0152173 A1* | 6/2008 | Lee | 381/122 |
| 2008/0226381 A1* | 9/2008 | Chiu | 401/195 |

* cited by examiner

*Primary Examiner* — Disler Paul
(74) *Attorney, Agent, or Firm* — Li & Cai Intellectual Property (USA) Office

(57)      ABSTRACT

The invention provides a touch pen with wireless voice capability which comprises a body, an audio receiving unit, a wireless communication module, and a micro-processing unit. The body has a touch portion and a first signal connector. The wireless communication module is disposed in the body, and the wireless communication module is for wirelessly transmitting audio data generated by the audio receiving unit and for wirelessly receiving audio data. The micro-processing unit is disposed in the body and is electrically coupled to the audio receiving unit and the wireless communication module. The micro-processing unit transmits the audio data received by the wireless communication module to the first signal connector. Accordingly, the touch pen with wireless voice capability provides the personal wireless voice communication for the user, or cooperates with a speaker device adapted to the conference call for multi-users.

9 Claims, 5 Drawing Sheets

TOUCH PEN WITH WIRELESS VOICE CAPABILITY

BACKGROUND OF THE INVENTION

1. Field of the Invention

The present invention relates to a wireless communication device; in particular, to a touch pen with wireless voice capability.

2. Description of Related Art

At present, wireless communication devices can replace most functions of wired communication devices. On the trend of mobile communications, wireless communication device with light weight and small size is the common objective of most manufacturers.

Wireless communication devices are often adapted to communication specifications such as, Bluetooth, Zigbee, WiFi . . . etc. Taking the Bluetooth device as an example, Bluetooth devices can communicate (or link) with each other through relatively simple protocols such as, files transmission between the mobile phone and the earphone of itself or having the traditional wired communication devices become wireless. Similarly, Zigbee specification has the same functions with lower power consumptions. Additionally, WiFi specification provides a higher transmission rate to speed up transmission of data.

The traditional earphone has advantages of small size and convenience for carrying. However, functions of the traditional earphone are limited, and the traditional earphone may not have functions for multi-purpose excepting the function of wireless voice communication. Therefore, the wireless communication device with the same function of the earphone still needs development for the demand of multi-purpose for a single device (or product).

SUMMARY OF THE INVENTION

The object of the present invention is to provide a touch pen with wireless voice capability. A body and a detachable speaker module of the touch pen with wireless voice capability accomplish convenient personal voice communications or conference call capability. For the conference call, the user can detach the detachable speaker module from the body and have the body connect with a speaker device adapted to the conference call for the convenience of multi-users on the conference call.

In order to achieve the aforementioned objects, according to an embodiment of the present invention, a touch pen with wireless voice capability is offered. The touch pen with wireless voice capability comprises a body, an audio receiving unit, a wireless communication module, and a micro-processing unit. The body has a touch portion and a first signal connector. The wireless communication module is disposed in the body, and the wireless communication module is for wirelessly transmitting audio data generated by the audio receiving unit and for wirelessly receiving audio data. The micro-processing unit is disposed in the body and is electrically coupled to the audio receiving unit and the wireless communication module. The micro-processing unit transmits the audio data received by the wireless communication module to the first signal connector.

In summary, the touch pen with wireless voice capability provides touch control capability and personal wireless voice communications, or can cooperate with a speaker device adapted to the conference call for multi-users.

In order to further understand the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
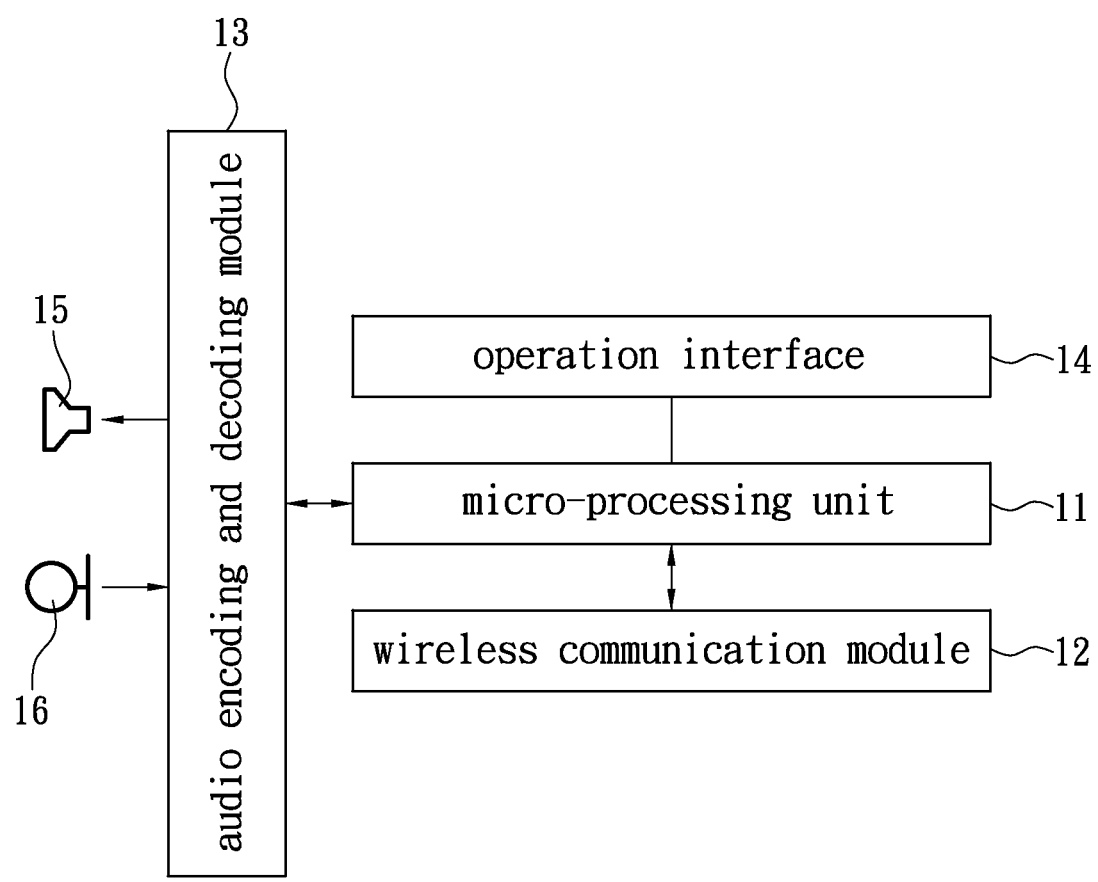
FIG. 1 shows a block diagram of a touch pen with wireless voice capability according to an embodiment of the present invention.
Figure 2A:
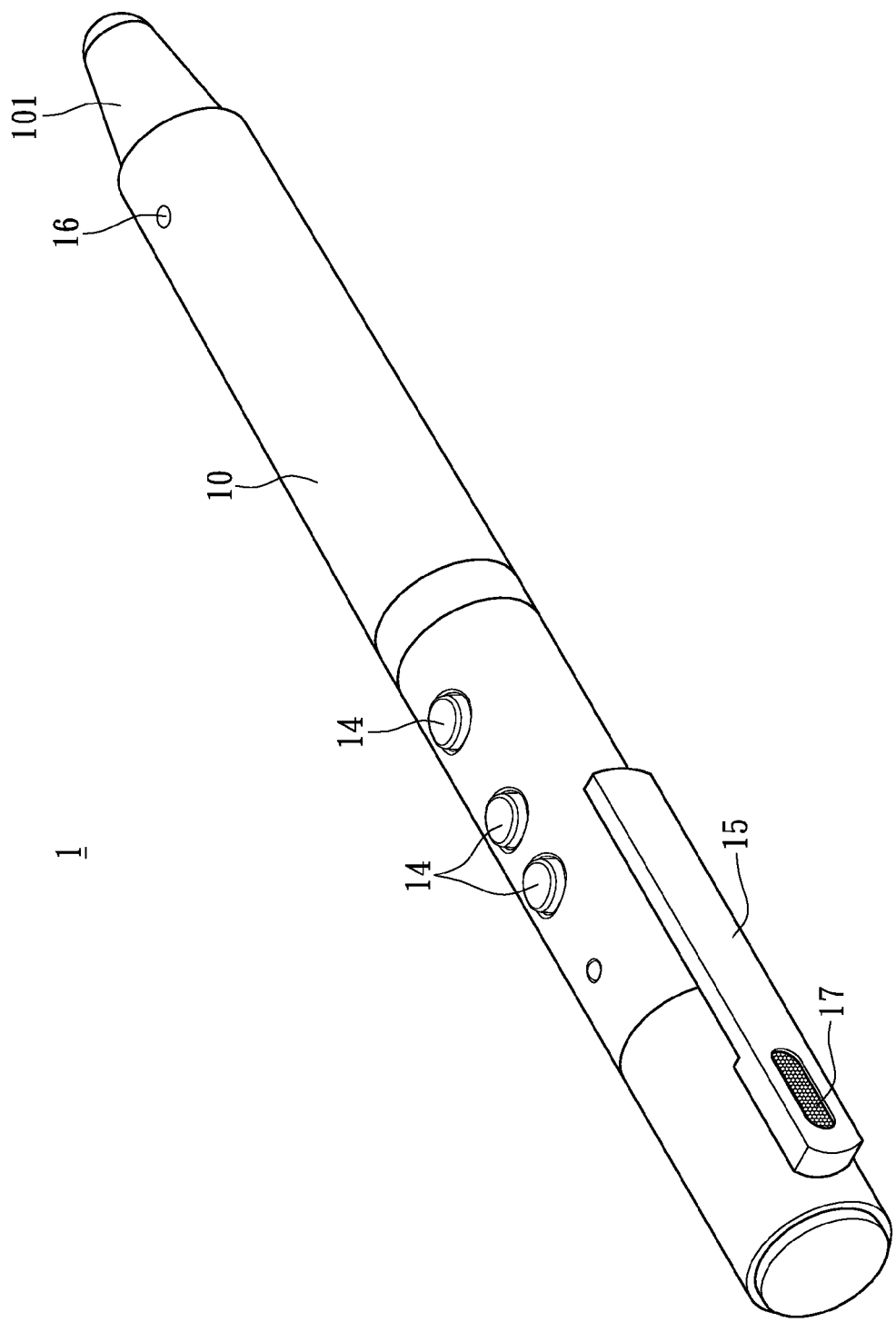
FIG. 2A shows a schematic diagram of a touch pen with wireless voice capability according to an embodiment of the present invention.
Figure 2B:
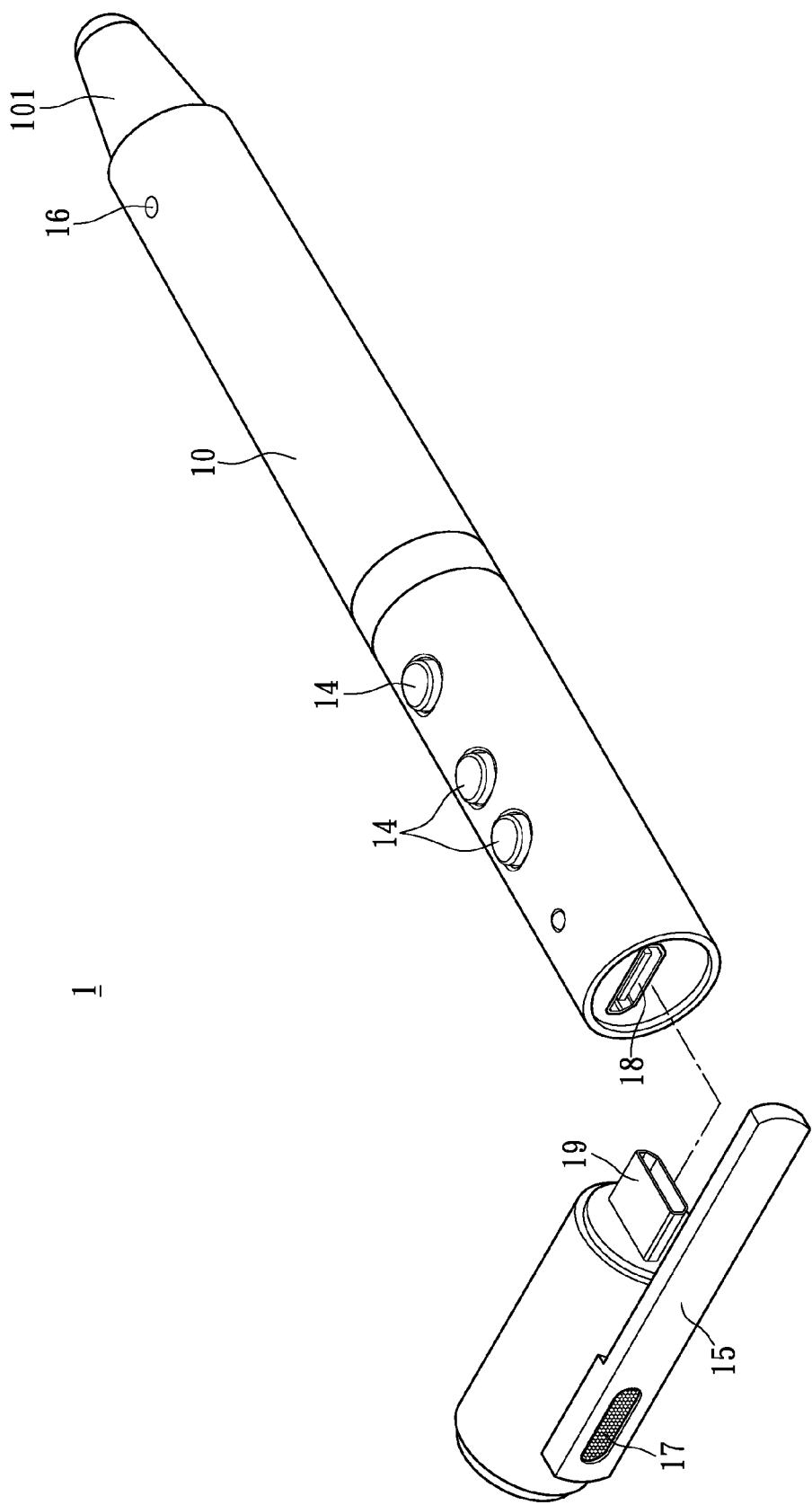
FIG. 2B shows a schematic diagram of a touch pen with wireless voice capability in separation according to an embodiment of the present invention.

Please refer to FIG. 1, FIG. 2A, and FIG. 2B, FIG. 1 shows a block diagram of a touch pen with wireless voice capability according to an embodiment of the present invention, FIG. 2A shows a schematic diagram of a touch pen with wireless voice capability according to an embodiment of the present invention, FIG. 2B shows a schematic diagram of a touch pen with wireless voice capability in separation according to an embodiment of the present invention. As shown in FIG. 1, a touch pen with wireless voice capability 1 mainly comprises a micro-processing unit 11, a wireless communication module 12, an audio encoding and decoding module 13, an operation interface 14, a speaker module 15, and an audio receiving unit 16. As shown in FIG. 2B, the touch pen with wireless voice capability 1 further comprises a body 10 which has a touch portion 101 and a first signal connector 18. The speaker module 15 has a speaker unit 17 and a second signal connector 19.

As shown in FIG. 1, the operation interface 14 and the wireless communication module 12 are electrically coupled to the micro-processing unit 11 separately. The audio encoding and decoding module 13 is electrically coupled between the micro-processing unit 11 and the speaker module 15. The audio encoding and decoding module 13 is also electrically coupled to the audio receiving unit 16. As shown in FIG. 2B, the touch portion 101 is at one end of the body 10, and the first signal connector 18 is disposed on the surface of the body 10. The speaker module 15 is detachably coupled to the first signal connector 18 of the body 10 through the second signal connector 19. The speaker unit 17 is disposed on the surface of the speaker module 15 and is electrically coupled to the second signal connector 19. The wireless communication module 12, the audio encoding and decoding module 13 and the audio receiving unit 16 is disposed in the body 10. When the speaker module 15 is detached from the body 10, the body 10 may connect to other speaker device (not shown) through the first signal connector 18.

The appearance of the body 10 looks like a pen, and the touch portion 101 of the body 10 is a pen head. The touch portion 101 is used for touching control on the touch panel which can be capacitive sensing, resistive sensing, or inductive sensing . . . etc. Accordingly, the touch portion 101 is designed to match the sensing type of the touch panel. An artisan of ordinary skill in the art will appreciate the implementation manner of the touch portion 101, thus there is no need to go into details.

The body 10 is also for accommodating the micro-processing unit 11, the wireless communication module 12, the audio encoding and decoding module 13, and the audio receiving unit 16. Accordingly, the user may carry the touch pen with wireless voice capability 1 as conveniently as carry a traditional pen, pencil, or ball-point pen. Contradictory to a traditional pen, the touch portion 101 of the body 10 is for operation on a touch panel. The touch pen with wireless voice capability 1 may further comprise a pen clip for the user to clip the touch pen with wireless voice capability 1 in the shirt pocket. Additionally, a substrate (not shown) may be disposed in the body 10, thus the wireless communication module 12, the micro-processing unit 11 and the audio encoding and decoding module 13 may be disposed on the substrate. The substrate may be a circuit board, for example, a multilayer circuit board mounted with electronic components on both sides.

The micro-processing unit 11 is used to control the wireless communication module 12 for receiving or transmitting audio data. The micro-processing unit 11 adjusts the sound volume of the touch pen with wireless voice capability in the voice communication according to the configuration of the operation interface 14. The user can make manual adjustment for the operation interface 14 to adjust the sound volume in the voice communication. The operation interface 14 may comprise a push button, a roller, or a slide switch or an electronic switch or combinations thereof.

The wireless communication module 12 is used for receiving audio data from a far end (not shown) or transmitting the audio data to the far end through wireless transmission. The wireless communication module 12 may be a Bluetooth module, a Zigbee module, or a WiFi module. The far end may be a mobile phone, a cordless telephone, or a personal computer with wireless transmission capability. The far end with its own wireless communication module may communicate with the wireless communication module 13 through Bluetooth, Zigbee, or WiFi.

The audio encoding and decoding module 13 is used for decoding the audio data received by the wireless communication module 12, and forwarding the decoded audio data to the speaker unit 17 of the speaker module 15 through the first signal connector 18 and the second signal connector 19. The audio encoding and decoding module 13 is also used for encoding audio data received by the audio receiving unit 16, and passing the encoded audio data to the wireless communication module 12 (through the micro-processing unit 10). The speaker unit 17 of the speaker module 15 is used for converting the audio data transmitted from the audio encoding and decoding module 13 into sounds. The audio receiving unit 16 is used for converting the received sounds into audio data, and transmitting the audio data to the audio encoding and decoding module 13.

Please refer to FIG. 2A and FIG. 2B again; the appearance of the speaker module 15 may be a pen cap. The operation of connecting or separating the body 10 and the speaker module 15 may similar to connecting or separating the traditional pen (or the ball-point pen) and the pen cap. The speaker module 15 with appearance of pen cap makes the appearance of the touch pen with wireless voice capability 1 be similar to a traditional pen for artistic outlook.

When the body 10 and the speaker module 15 are connected through the first signal connector 18 and the second signal connector 19, the electric power for the speaker module 15 to generate the sound is transmitted from the body 10 to the speaker module 15 through the first signal connector 18 and the second signal connector 19. In other words, the body 10 may further comprise an electric power unit (not shown) which can provide electric power to the speaker module 15, but the invention is not restricted thereto. The speaker module 15 may have an electric power unit for providing the required electric power.

Figure 3:
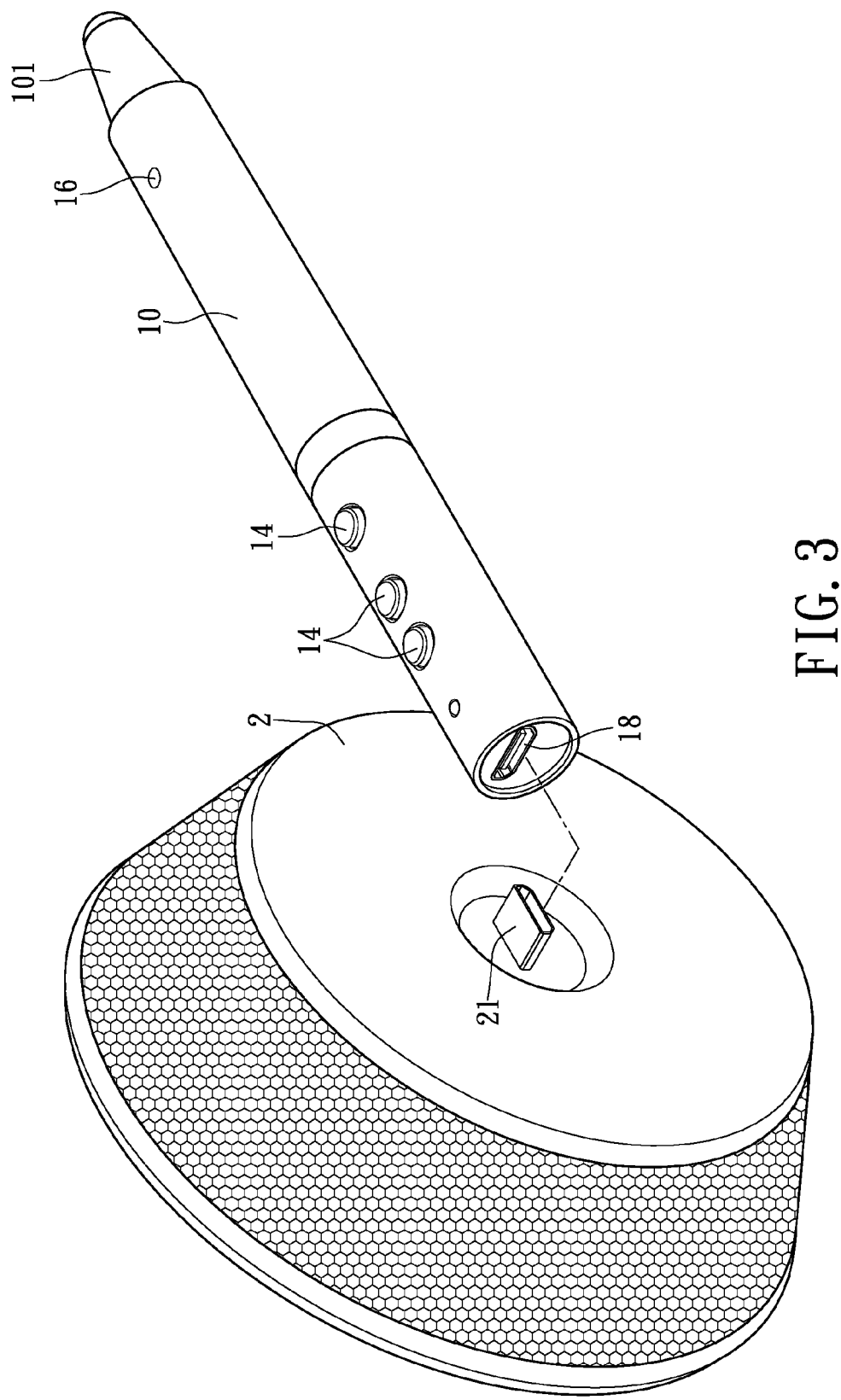
FIG. 3 shows a schematic diagram of a touch pen with wireless voice capability connecting to a speaker device according to an embodiment of the present invention.

Please refer to FIG. 2B and FIG. 3, FIG. 3 shows a schematic diagram of a touch pen with wireless voice capability connecting to a speaker device according to an embodiment of the present invention. When the speaker module 15 is detached from the body 10, the body 10 may be connected to a third signal connector 21 of a speaker device 2. The functions of the speaker device 2 are similar to that of the speaker module 15. Differing from the speaker module 15, the speaker device 2 amplifies and outputs the audio data received by the wireless communication module 12, wherein the audio data is decoded by the audio encoding and decoding module 13. At this time, the touch pen with wireless voice capability 1 may operates in a conference mode (for a conference call), and the sound volume provided by the speaker device 2 should be louder than that provided by the speaker module 15 so that multi-users can talk on a conference call at the same time accordingly. In general, the speaker module 15 may have a power amplifying circuit and a speaker unit with a proper rated power. Additionally, the speaker device 2 as shown in FIG. 3 may be disposed on the conference table, thus more than two users may use the touch pen with wireless voice capability 1 to talk on the call. For example, more than two users can make a conference call with the people at the other end of the line (opposite to the far end).

It should be noticed that the third signal connector 21 may be equal to the second signal connector 19, and whether the speaker device 2 receives the electric power transmitted from the body 10 through the first signal connector 18 is determined according to the design of the speaker device 2. However, the third signal connector 21 may be not equal to the second signal connector 19, as long as the third signal connector 21 and the second signal connector 19 can receive the audio data transmitted from the first signal connector 18.

Comparing to the speaker module 15, the speaker device 2 may need a larger electric power to provide sufficient sound volume for usage of more than two users. Therefore, the speaker device 2 may further comprise an electric power unit (not shown) with excess electric power. Accordingly, the touch pen with wireless voice capability 1 can just provide audio data to the speaker device 2 without the need of providing electric power, but the invention is not restricted thereto. When the electric power of the touch pen with wireless voice capability 1 is sufficient to let the speaker device 2 generate sounds loud enough, the speaker device 2 can just draw the electric power from the touch pen with wireless voice capability 1.

Figure 4:
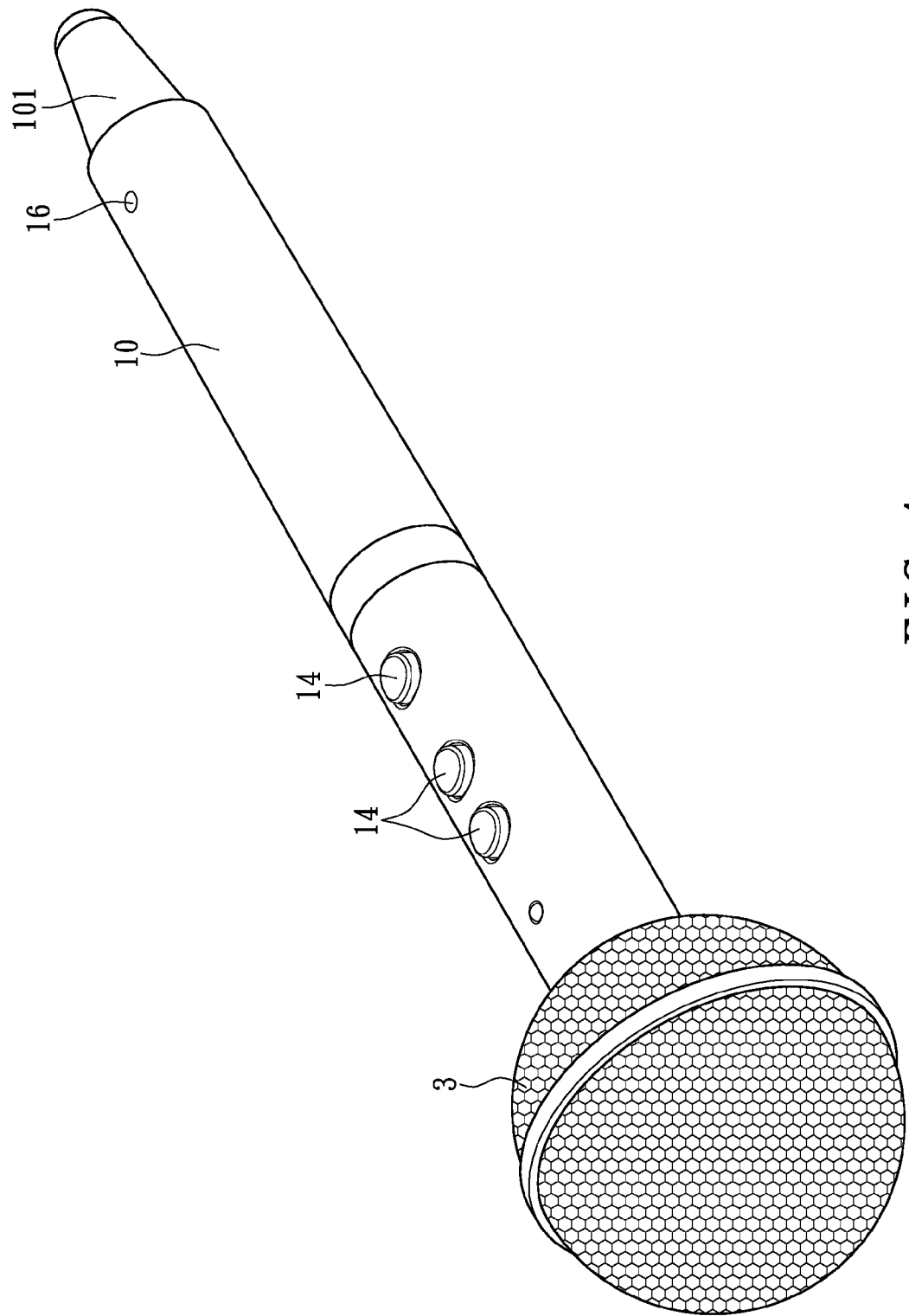
FIG. 4 shows a schematic diagram of a touch pen with wireless voice capability connecting to a speaker device according to an embodiment of the present invention.

Please refer to FIG. 2B and FIG. 4, FIG. 4 shows a schematic diagram of a touch pen with wireless voice capability connecting to a speaker device according to an embodiment of the present invention. When the speaker module 15 is detached from the body 10, the body 10 may be used for connecting to a signal connector (not shown in the figure) of the speaker device 3 through the first signal connector 18. The signal connector of the speaker device 3 may be equal to the third signal connector 21 of the speaker device 2 as shown in FIG. 3. The speaker device 3 may be in a spherical shape as shown in FIG. 4. Accordingly, one of the users may hold the touch pen with wireless voice capability 1 by hand for making a conference call by the touch pen with wireless voice capability 1 cooperated with the speaker device 3.

According to embodiments of the present invention, the touch pen with wireless voice capability provides touch control capability, and can be a hands-free earphone for the user to make a wireless phone call. When the body of the touch pen with wireless voice capability is connected to the speaker device, the speaker device provides sufficient volume of sounds for listening of multi-users, and for making a conference call accordingly. Additionally, the touch pen with wireless voice capability can change the sound volume of voice communications through adjustment of the operation interface.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A touch pen with wireless voice capability, comprising:
   a body, having a touch portion and a first signal connector;
   an audio receiving unit;
   a wireless communication module, disposed in the body of the touch pen, for wirelessly transmitting audio data generated by the audio receiving unit and for wirelessly receiving audio data;
   a micro-processing unit, disposed in the body and electrically coupled to the audio receiving unit and the wireless communication module, the micro-processing unit transmitting the audio data received by the wireless communication module to the first signal connector;
   a speaker module for personal voice communications, having a second signal connector, the speaker module for being detachably coupled with the first signal connector of the body through the second signal connector, wherein the audio data received by the wireless communication module is transmitted to the speaker module through the first signal connector and the second signal connector; and
   a speaker device for conference call, having a third signal connector, the speaker device for being detachably coupled with the first signal connector of the body through the third signal connector, wherein the speaker device amplifies and outputs the audio data received by the wireless communication module;
   wherein one of the speaker module and the speaker device is selected to be detachably coupled with the first signal connector of the body, and the sound volume provided by the speaker device is louder than the sound volume provided by the speaker module.

2. The touch pen with wireless voice capability according to claim 1, wherein the appearance of the speaker module is a pen cap.

3. The touch pen with wireless voice capability according to claim 2, wherein the electric power for the speaker module to generate the sound is transmitted from the body to the speaker module through the first signal connector and the second signal connector.

4. The touch pen with wireless voice capability according to claim 1, wherein the speaker device further comprises an electric power unit for providing electric power to the speaker device.

5. The touch pen with wireless voice capability according to claim 1, wherein the wireless communication module is a Bluetooth module, a Zigbee module, or a WiFi module.

6. The touch pen with wireless voice capability according to claim 1, further comprising:
   an operation interface, disposed on the surface of the body and electrically coupled to the micro-processing unit, wherein the micro-processing unit adjusts the sound volume of the touch pen with wireless voice capability in the voice communication according to the configuration of the operation interface.

7. The touch pen with wireless voice capability according to claim 6, wherein the operation interface comprises a push button, a roller, or a slide switch or an electronic switch or combinations thereof.

8. The touch pen with wireless voice capability according to claim 1, further comprising:
   an audio encoding and decoding module, disposed in the body and electrically coupled between the micro-processing unit and the first signal connector, for decoding the audio data received by the wireless communication module and encoding the audio received by the audio receiving unit.

9. The touch pen with wireless voice capability according to claim 1, wherein the speaker device is for being disposed on a conference table.

* * * * *